United States Patent [19]

Alvi et al.

[11] 4,046,053

[45] Sept. 6, 1977

[54] BLIND RIVET

[75] Inventors: Zia Raheem Alvi, Hatfield; William David Bradley; Keith Denham, both of Welwyn Garden City; Frederick Arthur Summerlin, Wheathampstead, all of England

[73] Assignee: Aerpat A.G., Zug, Switzerland

[21] Appl. No.: 671,149

[22] Filed: Mar. 29, 1976

[30] Foreign Application Priority Data

Apr. 1, 1975 United Kingdom ............... 13290/75

[51] Int. Cl.$^2$ .......................................... F16B 13/08
[52] U.S. Cl. .......................................... 85/72; 85/77
[58] Field of Search .................... 85/77, 78, 73, 72, 37

[56] References Cited

U.S. PATENT DOCUMENTS

| 2,691,915 | 10/1954 | Cherry | 85/78 |
| 3,073,205 | 1/1963 | Siebol | 85/78 |
| 3,252,493 | 5/1966 | Smith | 85/73 X |
| 3,276,308 | 10/1966 | Bergere | 85/72 |
| 3,292,482 | 12/1966 | Fry et al. | 85/78 |
| 3,465,637 | 9/1969 | Cushman et al. | 85/72 |
| 3,657,957 | 4/1972 | Siebol | 85/77 |
| 3,685,391 | 8/1972 | Gapp et al. | 85/77 |

FOREIGN PATENT DOCUMENTS

| 2,319,221 | 10/1973 | Germany | 85/77 |
| 596,275 | 12/1947 | United Kingdom | 85/78 |

Primary Examiner—Roy D. Frazier
Assistant Examiner—Rodney H. Bonck
Attorney, Agent, or Firm—Oblon, Fisher, Spivak, McClelland & Maier

[57] ABSTRACT

A blind rivet for fastening apertured sheets comprises a tubular shell having a head at one end, and a mandrel having an enlarged head which when pulled into the bore of the shell deforms the shell to produce a blind head. The mandrel has a breaker groove at which it breaks when the rivet is fully placed, leaving the mandrel head plugging the shell. The mandrel head has an integral peripheral skirt which can be deformed outwardly by a tool used for placing the rivet, so that the skirt engages the shell and prevents the mandrel head from being pushed out of the bore of the shell. The mandrel head is adapted to wiredraw after the blind head has been formed so that the mandrel will break substantially flush with the head of the shell when fastening either thick or thin sheets.

10 Claims, 14 Drawing Figures

BLIND RIVET

BACKGROUND OF THE INVENTION

The invention relates to a blind rivet and more particularly to a blind rivet of the type comprising a tubular shell and a mandrel having an elongate stem and an enlarged head, in which the mandrel stem is used to pull the mandrel head into the shell to radially expand the latter, to form a blind head, and then breaks off to leave the mandrel head plugging the bore of the shell. A blind rivet of this type is hereinafter referred to as "a blind rivet of the type defined".

SUMMARY OF THE INVENTION

It is an object of the invention to provide a blind rivet of the type defined with means whereby the head of the mandrel may be locked into the tubular shell so as to reduce the likelihood of the mandrel head becoming separated from the shell when the rivet is in use.

According to the present invention there is provided a blind rivet of the type defined including a breaker groove at the junction of the mandrel head and mandrel stem, the head of the mandrel having a peripheral skirt presenting a step facing across the breaker groove towards the stem, which skirt can be deformed outwardly into engagement with the rivet shell after the mandrel head has been pulled into the shell to assist in locking the mandrel head in the shell.

The step may lie in a plane at right angles to the longitudinal axis of the mandrel.

The step may be in substantially the same plane as the side of the breaker groove which is towards the head of the mandrel.

The rivet shell may include a suitable recess in which the peripheral skirt can be received when the skirt is suitably deformed.

BRIEF DESCRIPTION OF THE DRAWINGS

Embodiments of the invention will now be described by way of example and with reference to the accompanying drawings, in which.

DETAILED DESCRIPTION OF THE ILLUSTRATED EMBODIMENTS

Figures 1, 2, 11, 12:
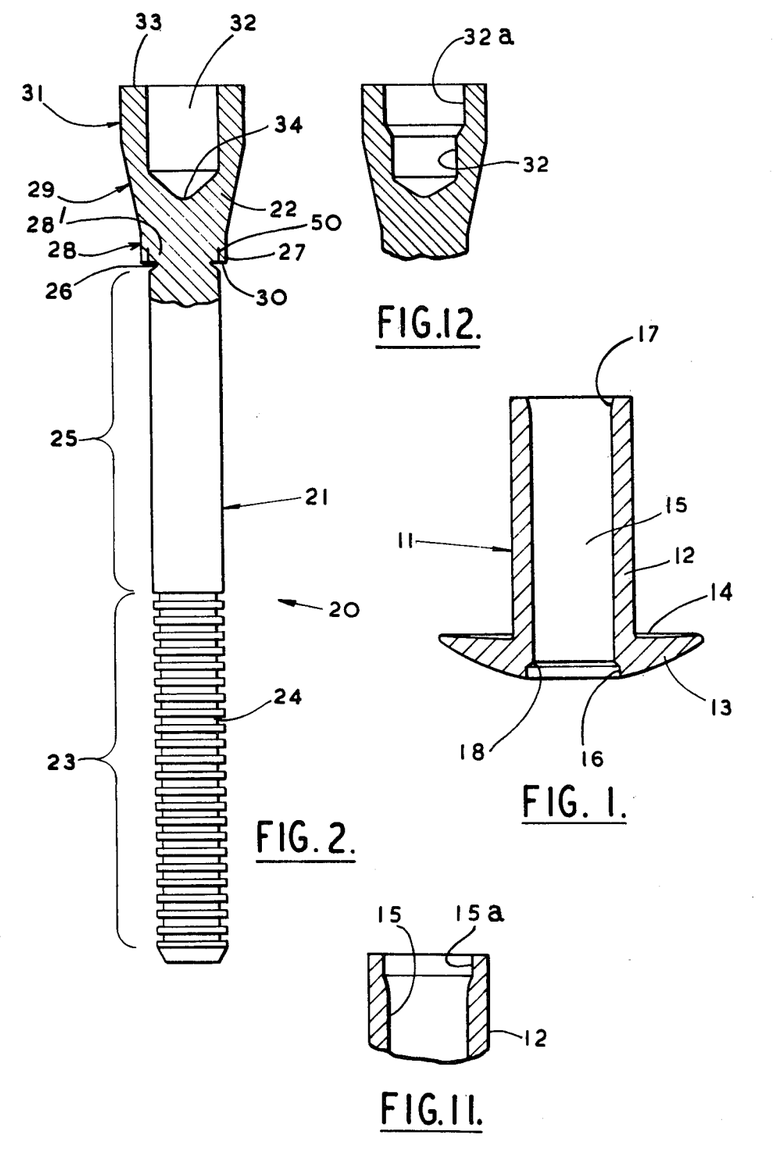
FIG. 1 is an axial section through the shell of one form of blind rivet.
FIG. 2 is an elevation of the mandrel of the blind rivet with the head end in axial section.
FIGS. 11 and 12 are fragmentary sectional views of further embodiments showing modifications to the shape of the shell and mandrel head cavity, respectively.

The first embodiment of the invention comprises a tubular shell 11 (shown in FIG. 1) and a mandrel 20 (shown in FIG. 2). The shell 11 is made of annealed 0.35% carbon steel and comprises a cylindrical shank 12 and an enlarged head 13 formed integrally with one end (the head end) of the shank. The underside of the head (i.e., the face directed towards the shank) is slightly dished or concave as shown at 14 in FIG. 1. The shell has a bore 15 extending completely throughout the length of the head and shank. The bore 15 is of uniform diameter, except for a short counterbore 16 at the head end of the shell and a slight flare 17 at the tail end (i.e., the end remote from the head end).

The mandrel 20 is made of 0.35% carbon steel, hardened and tempered. The mandrel is of circular cross-section and comprises an elongate stem 21, an enlarged head 22 at one end (the head end) and a breaker groove 26 which demarcates the stem from the head. The mandrel stem 21 comprises a tail 23 which is remote from the head, and a plain part 25 between the tail and the breaker groove. The tail 23 is provided with a plurality of annular grooves 24 less deep than the breaker groove, and the plain part 25 has a plain exterior of uniform diameter.

The mandrel head 22 comprises a first part 28 adjacent to the breaker groove and of uniform external diameter, an intermediate tapering part 29 which increases in diameter away from the stem, and a terminal part 31 of uniform external diameter greater than any other part of the mandrel.

Figure 2A:
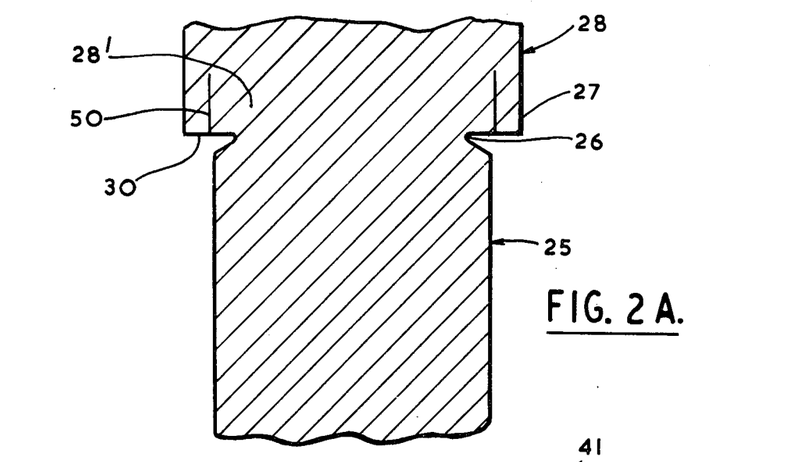
FIG. 2a is an enlargement of part of FIG. 2.

The first part 28 is of slightly greater external diameter than the stem 21 and provides a step 30 facing the stem across the breaker groove. The part 28 has a core 28', the diameter of which is equal to or very slightly greater than the outer diameter of stem 21, and a skirt 27 peripherally surrounding the core, there being between the skirt and the core 28' an annular cleavage 50 extending from the step 30 towards the head end of the mandrel through a distance approximately equal to the difference in radius of the bore 15 and counterbore 16 of the shell 11. The peripheral skirt 27 is closely adpressed to the core 28' so that the cleavage does not form a gap. The core 28' presents a face which constitutes one side of the breaker groove and this face lies in a single plane with the step 30 at right angles to the longitudinal axis of the mandrel.

The mandrel head is formed with an internal cavity in the form of an axial cylindrical bore 32 within the terminal part 31 and part of the intermediate tapering part 29 of the head. The bore 32 opens into the end face 33 of the head and extends into the tapering part 29 through a distance which is arranged to achieve a wall thickness of appropriate dimension for ensuring that the head of the mandrel will wiredraw during placing of the rivet when subjected to a force less than that required to break the stem at the breaker groove. In this example, the internal diameter of the bore 32 is about equal to the external diameter of the stem 25. The inner end 34 of the head bore 32 is conical in form and is located about half-way along the length of the mandrel head.

Figure 3:
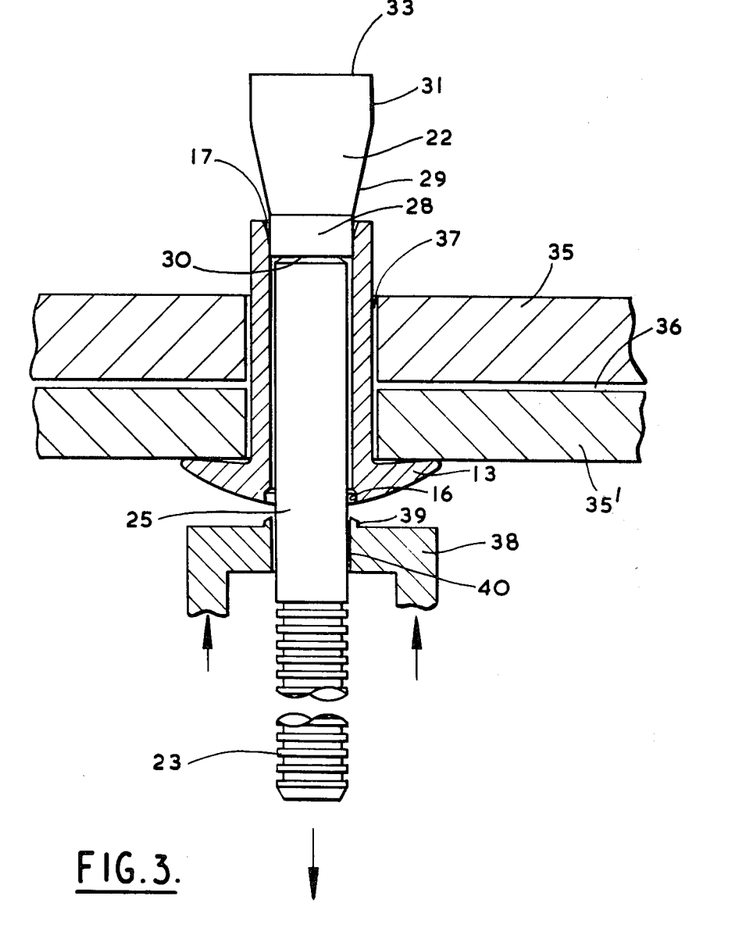
FIGS. 3 to 7 show the rivet applied to a relatively thick workpiece by means of a placing tool and illustrate successive stages in the placing of the rivet.

The mandrel and shell are assembled together to form a blind rivet, as illustrated in FIG. 3, with the stem of the mandrel extending through the bore 15 of the shell and projecting from the head end of the shell and the first part 28 of the mandrel head being push-fit inside the tail end of the shell.

The use of the blind rivet to fasten together two sheets will now be described with reference to FIGS. 3 to 10. In FIGS. 3 to 7, two adjacent sheets 35 35' are slightly spaced apart, by a gap 36. A cylindrical hole 37 is provided through both sheets, the diameter of the hole 37 being slightly greater than the external diameter of the shank 12 of the rivet shell. The rivet is placed by the use of a rivet-placing tool of a type which is well-known in the art of blind riveting. Essentially the tool consists of an annular anvil which can abut against the head of the shell, with the projecting stem of the mandrel extending through the aperture in the anvil and the grooved stem tail 23 being gripped by a set of pulling jaws. The tool includes means for closing the jaws to grip the grooved tail and for moving the jaws away from the anvil so as to pull the mandrel stem through the anvil and thus pull the mandrel head into the tail end of the rivet shank. Only the annular anvil 38 of such a tool is shown in FIGS. 3 to 9. In the tool used in this example, the anvil has an aperture 40 and a forwardly projecting annular rim 39 surrounding the aperture 40. This rim 39 has a forward end face which is inclined rearwardly and outwardly and which is relieved or recessed at a plurality of zones spaced apart circumferentially around it. The diameter of the aperture 40 is such that the rim 39 is able to engage, when appropriate, step 30 of the peripheral skirt 27 of the mandrel head.

Figure 4:
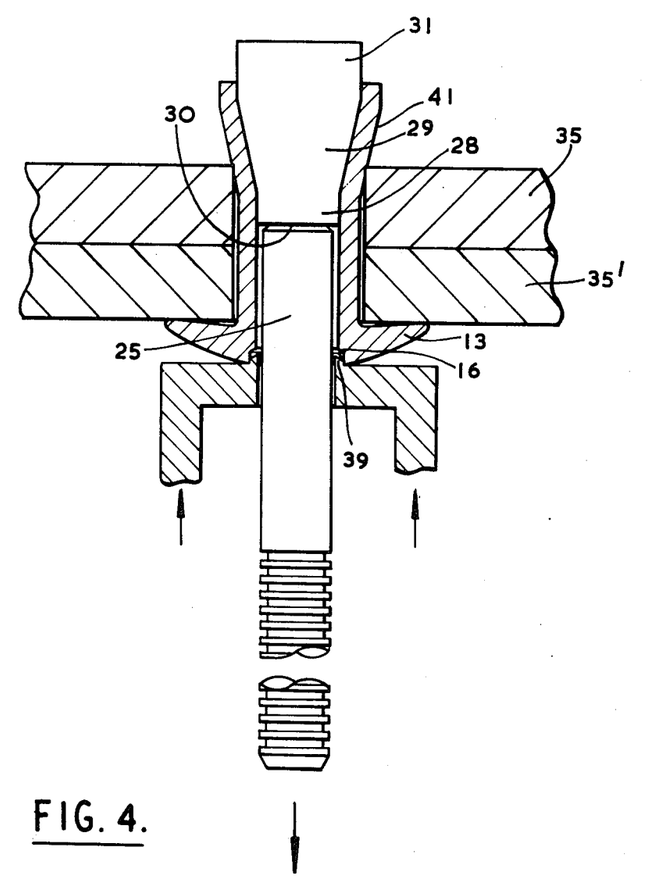

In use, the mandrel head 22 and the shank 12 of the rivet shell of the assembled blind rivet are inserted into the hole 37 in the sheets until the periphery of the dished underside of the head 13 of the shell contacts near face of the nearer sheet 35'. It will be seen from FIG. 3 that the total thickness of the two sheets 35, 35' is about two thirds of the length of the shell shank 12, this being the maximum total sheet thickness (known as the "maximum grip") which this rivet can fasten successfully. The placing tool is then offered up to the projecting tail 23 of the mandrel stem so that the tail passes through the anvil aperture 40 to be gripped by the jaws of the tool. This is the position shown in FIG. 3. The tool is then actuated so that the pulling jaws pull the mandrel stem further into the anvil. The anvil then abuts the head of the shell and the mandrel head 22 is progressively pulled further into the tail end of the shank of the shell against the reaction of the anvil 38 against the shell head 13. The rim 39 of the anvil is received within the counterbore 16 of the shell head and, as the tapered part 29 of the mandrel head enters the shell tail end, it radially expands the latter progressively from the tail end of the shell towards the shell head into the form of a blind head 41. FIG. 4 shows the position where the expanded part or blind head 41 of the shell tail has contacted the rear or blind face of the back sheet 35 and pulled the latter into contact with the front sheet 35', thus closing the gap 36. Up to this stage, there has been relatively little resistance to expansion to the shell, and the mandrel head has not been distorted. However, on continued pulling on the mandrel stem by the placing tool, further radial expansion of the shell is limited by engagement of the expanded shell with the periphery of the hole 37. Consequently the part of the shell in contact with the mandrel head in a region adjacent to the plane of the rear face of the rear sheet acts as a die, and the material of the mandrel head wiredraws as it is pulled past this region.

Figure 5:
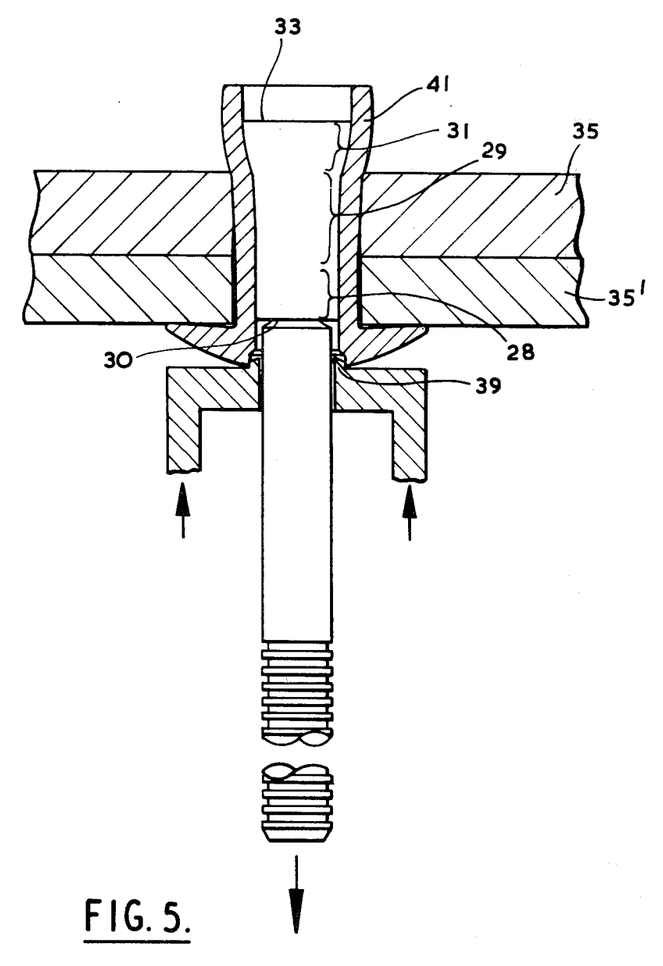

FIG. 5 shows the result of wiredrawing of the mandrel head at a stage beyond that shown in FIG. 4. Substantially all of the part 29 of the mandrel head, which was initially of tapered shape, has wiredrawn, so that its external diameter has become nearly uniform and equal to that of the narrow first part 28 of the mandrel head (which has not wiredrawn), with a consequent increase in axial length. Also, the terminal part 31 of the mandrel head, which was originally also of uniform external diameter, has been wiredrawn to an extent which increases progressively away from the end face 33, so that the external shape of the part 31 is now a curved taper. The mandrel head cavity 32 has also correspondingly increased in length ad decreased in diameter. At this stage, the annular step 30 on the mandrel head is still some distance away from the head end of the shell and the rim 39 of the anvil.

Figure 6:
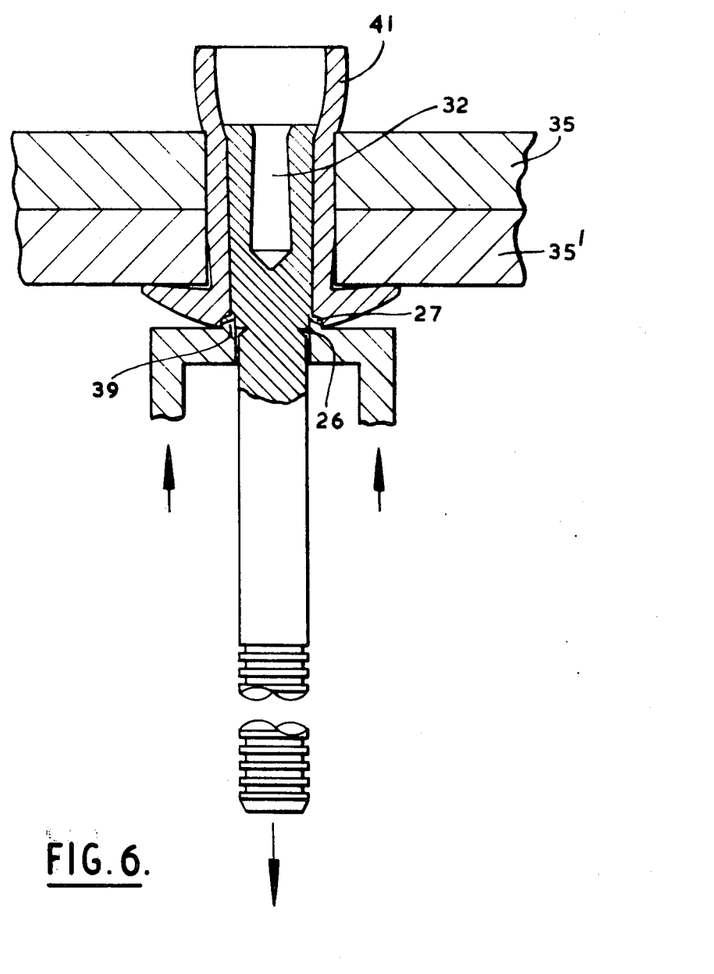
Figure 6A:
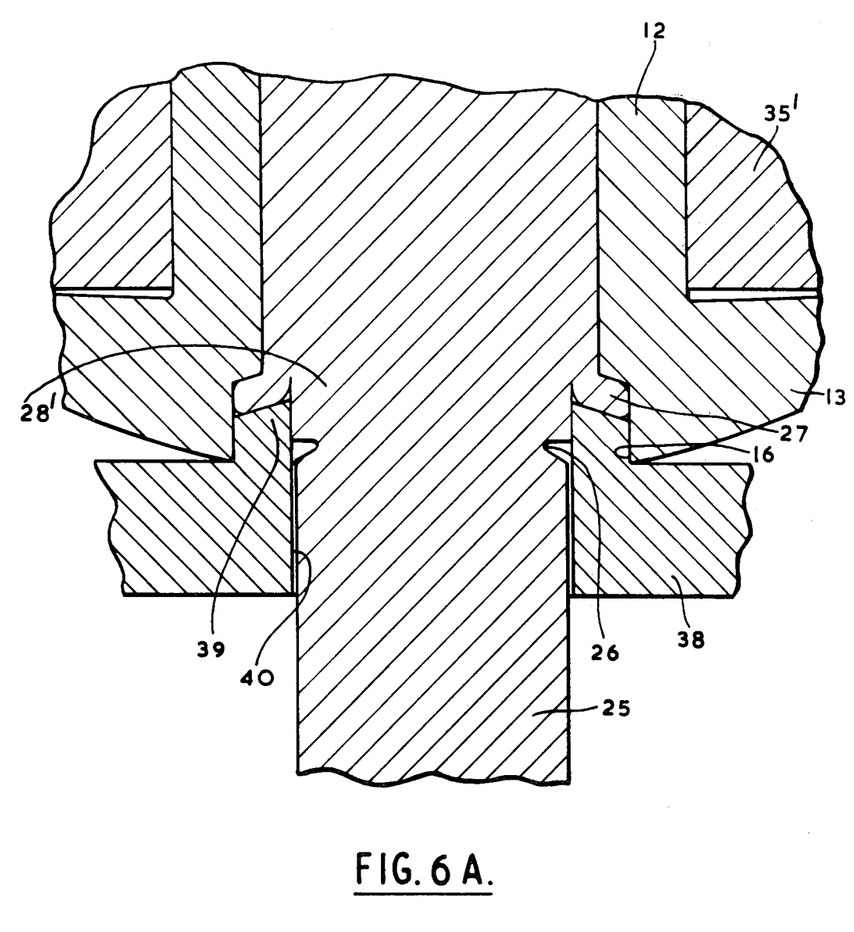

FIGS. 6 and 6a show the position where the mandrel head has been pulled as far as possible into the shell. (FIG. 6a is an enlargement of part of FIG. 6 and corresponds to FIG. 2a). The annular anvil rim 39 has abutted against the step and, due to the inclination of the forward end face of the rim, has deformed the mandrel skirt 27 outwardly away from the core 28' and into contact with the shoulder 18 in the shell head.

Figure 7:
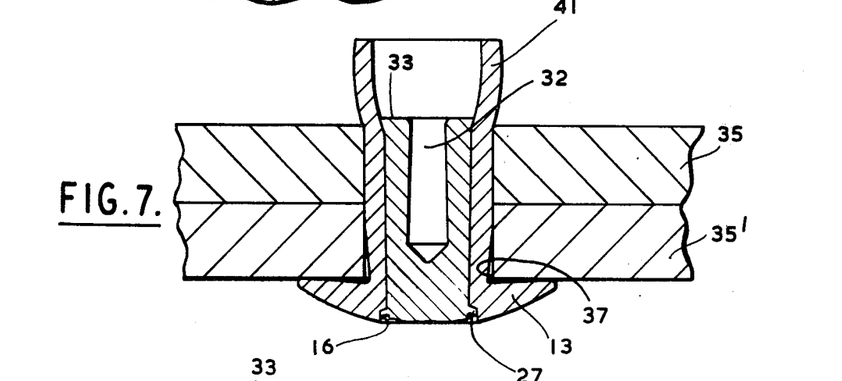

As the anvil is now in abutment with the deformed skirt of the mandrel head, the tensile force to which the breaker groove is subjected on continued pulling on the mandrel stem increases abruptly and causes the stem to break at the breaker groove, leaving the rivet in the fully placed condition illustrated in FIG. 7. It will be seen that the rivet is locked securely into the sheets, which are clamped together between the head 13 of the rivet shell and the blind head 41 which has been formed by the expansion of the tail end of the sheel. The end face 33 of the mandrel head is still just outside the plane of the back face of the sheets. The hole 37 in the sheets has been substantially filled, apart from a small gap around the shell shank adjacent the shell head. The mandrel head is locked into the shell by engagement of the deformed skirt 27 with the shoulder 28 at one end, and by the part immediately adjacent the other end face 33, which is still of larger diameter than the shell bore. Substantially all of the initially tapered part 29 and larger part 31 of the mandrel head have been wiredrawn to a diameter very little greater than that of the small part 28 of the head.

Figure 8:
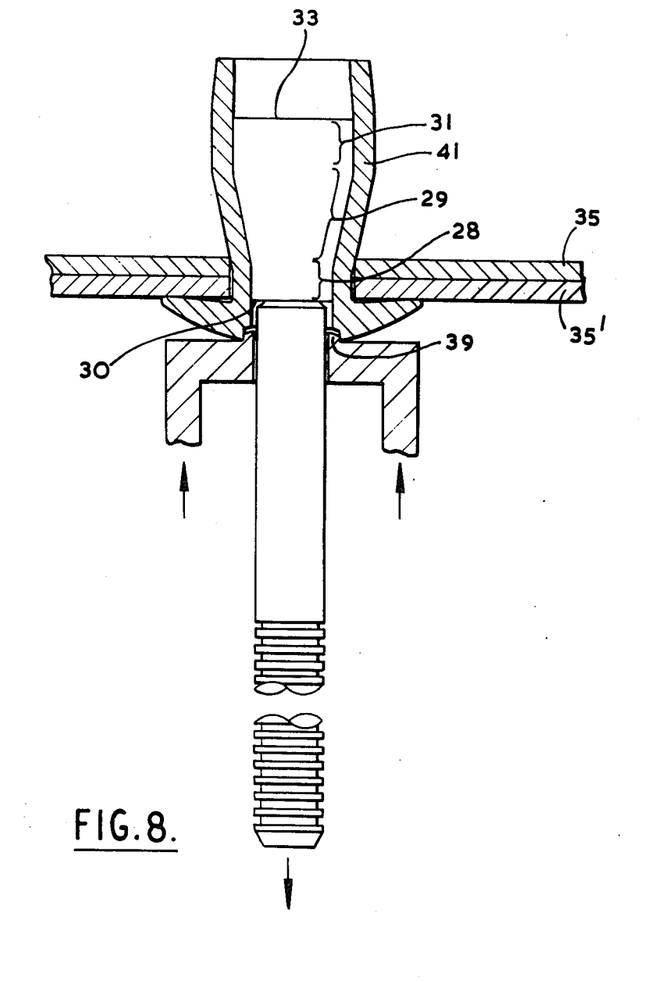
FIGS. 8 to 10 show an identical rivet applied to a relatively thin workpiece and correspond respectively to FIGS. 5, 6 and 7.
Figure 9:
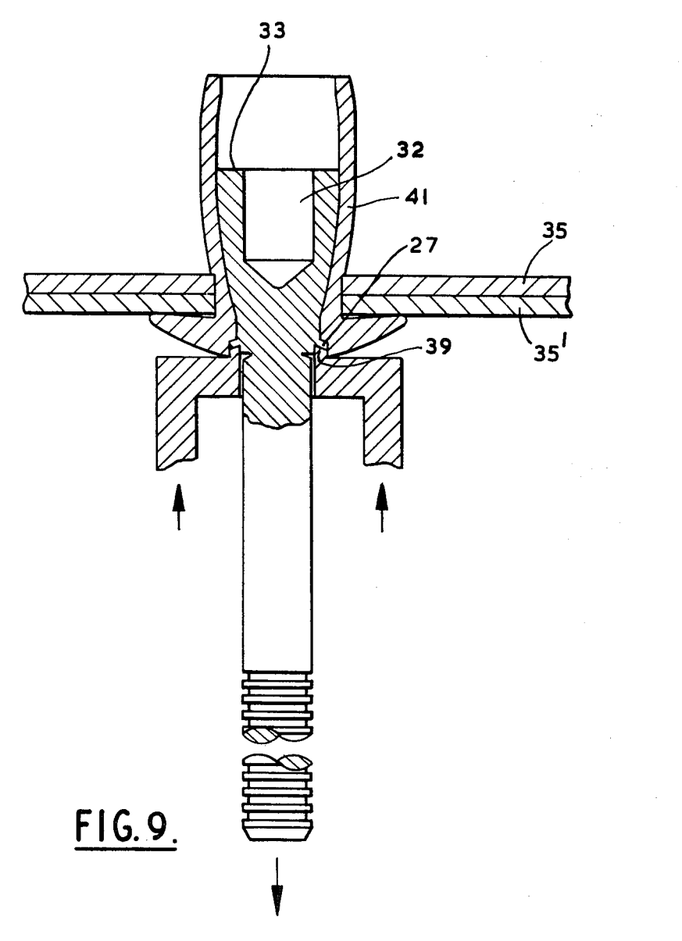
Figure 10:
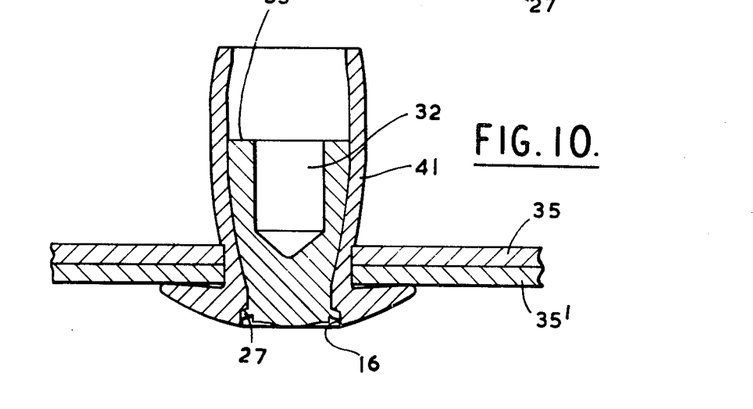

FIG. 8, 9 and 10 illustrate the use of the same embodiment of blind rivet to fasten sheets of a very much lesser total thickness or grip, which is in fact about the minimum grip in which this fastener will work satisfactorily.

FIG. 7 and 10 show the two "fully placed" conditions, and a comparison of these will show that, in the "minimum grip" condition (FIG. 10), the mandrel head has been wiredrawn very much less. The exterior shape of the head is not very different to its original shape (compare FIG. 2), while the mandrel head bore 32 is not appreciably distorted. In both cases, the broken surface of the mandrel is just within the head of the shell, thereby giving a "flush break" which is desirable in practice. The maximum and minimum grip distances, shown in FIGS. 7 and 10, respectively, are in a ratio of about 4:1. This is a very wide grip range for identical rivets and is made possible by the fact that the head wiredraws to a varying extent dependent upon the extent of the grip to be accommodated.

The invention is not restricted to the details of the foregoing examples. For instance, the mandrel head bore 32 could be stepped, as shown in FIG. 12, to provide an enlarged counterbore 32a at the open end of the bore 32. The shell bore 32 could be stepped near its tail end, as shown in FIG. 11, to provide an enlarged counterbore 15a within the tail end of the shank 12, the transition from the counterbore 15a to the narrower 15 being radiussed convexly to provide a lead-in for the mandrel head.

We claim:

1. A blind rivet comprising a tubular shell having a bore throughout its length, and a mandrel, said mandrel comprising an elongate stem and an enlarged head and having a breaker groove at the junction of the stem and head, the head of the mandrel having a part adjacent to the breaker groove, said part comprising a core having an external diameter at least as great as the diameter of the stem, and a skirt peripherally surrounding said core, said skirt and said core presenting a common face defining a side of said breaker groove and facing towards the stem, said mandrel head being adapted to radially expand said tubular shell and thereby form a blind head when pulled into the bore of the shell, and said skirt being deformable outwardly into engagement with the shell to assist in locking the mandrel head in the expanded shell.

2. A blind rivet according to claim 1, wherein said common face presented by the skirt and the core lies in a plane at right angles to the length of the mandrel.

3. A blind rivet according to claim 1, wherein the peripheral skirt of the mandrel head is a push fit in the bore of the shell.

4. A blind rivet according to claim 1, wherein the skirt is closely adpressed to the core 5. A blind rivet according to claim 1, wherein the shell includes a shoulder arranged to engage the skirt of the mandrel when said skirt is deformed outwardly and thereby assist in locking the head of the mandrel in the bore of the shell.

6. A blind rivet according to claim 5, wherein said shoulder is adjacent an end of the tubular shell, and is provided by a counterbore.

7. A blind rivet according to claim 6, wherein the skirt extends from the common face in a direction away from the stem through a distance approximately equal to the difference in radius of the bore and the counterbore of the shell.

8. A blind rivet comprising:

a tubular shell having a shank, a head at one end of said shank and a bore throughout the length of said head and said shank; and a mandrel having an elongate stem and an enlarged head and having a breaker groove at the junction of said stem and said head, a part of said head of said mandrel adjacent to said breaker groove having an annular cleavage extending away from said breaker groove, said part of said head of said mandrel thereby being formed of a core disposed radially inwardly of said cleavage, said core having an external diameter at least as great as the diameter of said stem, and a skirt peripherally surrounding said core, said skirt being closely adpressed to said core and having an external diameter which is a push fit in the bore of said shell, and said skirt presenting an annular step forming, with the core, a face of said breaker groove facing towards said stem;

whereby said mandrel head is adapted to radially expand said tubular shell and thereby form a blind head when pulled into the bore of said shell, and said skirt is deformable outwardly into engagement with said shell to assist in locking said mandrel head in said expanded shell.

9. A blind rivet as set forth in claim 8, wherein said tubular shell further comprises a counterbore in the head end of said shell and a shoulder at the end of said counterbore spaced from the head end of said shell.

10. A blind rivet as set forth in claim 9, wherein said cleavage extends from the plane of said face of said core and said annular step, being substantially perpendicular thereto, through a distance approximately equal to the difference in radius of the bore and the counterbore of said tubular shell.

* * * * *